(12) United States Patent
Zhao et al.

(10) Patent No.: US 10,288,046 B2
(45) Date of Patent: May 14, 2019

(54) PLANETARY DRIVE ASSEMBLY

(71) Applicants: Jiying Zhao, Bristol, WI (US); Jianli Li, Bristol, WI (US)

(72) Inventors: Jiying Zhao, Bristol, WI (US); Jianli Li, Bristol, WI (US)

( * ) Notice: Subject to any disclaimer, the term of this patent is extended or adjusted under 35 U.S.C. 154(b) by 0 days.

(21) Appl. No.: 15/692,592

(22) Filed: Aug. 31, 2017

(65) Prior Publication Data

US 2019/0063410 A1   Feb. 28, 2019

(51) Int. Cl.
*F16H 3/44*    (2006.01)
*F03D 15/00*   (2016.01)
*F03D 80/80*   (2016.01)
*F16H 57/02*   (2012.01)
*F03D 1/00*    (2006.01)

(52) U.S. Cl.
CPC ............. *F03D 80/88* (2016.05); *F03D 15/00* (2016.05); *F16H 3/44* (2013.01); *F03D 1/00* (2013.01); *F16H 2057/02078* (2013.01)

(58) Field of Classification Search
CPC . F03D 80/88; F03D 15/00; F03D 1/00; F16H 3/44; F16H 2057/02078
See application file for complete search history.

(56) References Cited

U.S. PATENT DOCUMENTS

| | | |
|---|---|---|
| 3,572,167 A | 3/1971 | Bosko et al. |
| 4,132,131 A | 1/1979 | DeBruyne |
| 6,123,640 A | 9/2000 | Schulz |
| 6,176,804 B1 | 1/2001 | Kekki et al. |
| 7,004,878 B2 | 2/2006 | Gumpoltsberger et al. |
| D661,631 S | 6/2012 | Bohm et al. |
| 8,790,203 B2 | 7/2014 | Hehenberger |
| 2011/0142617 A1* | 6/2011 | Mashue ................ F03D 7/0224 415/229 |
| 2013/0270837 A1* | 10/2013 | Mongeau ............. H02K 7/1838 290/1 C |
| 2013/0324354 A1* | 12/2013 | Phebus ................. F16H 1/2818 475/348 |
| 2017/0175717 A1* | 6/2017 | Saenz De Ugarte Sevilla ............ F03D 13/20 |

* cited by examiner

*Primary Examiner* — David J Hlavka (57) ABSTRACT

A planetary drive assembly includes a first housing that is coupled a top end of a stanchion. A drive unit is rotatably positioned in the first housing. A plurality of wind propellers is coupled to the drive unit thereby facilitating the wind propellers to rotate the drive unit. A planetary driven unit is rotatably positioned in the first housing. The planetary driven unit is in mechanical communication with the drive unit such that the drive unit rotates the planetary driven unit when the wind propellers rotate the drive unit. The planetary driven unit is mechanically discrete from the first housing. Thus, the planetary driven unit inhibits the first housing from being exposed to rotational torque. The planetary driven unit is coupled to a generator thereby facilitating the wind propellers to rotate the generator.

15 Claims, 10 Drawing Sheets

PLANETARY DRIVE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to drive devices and more particularly pertains to a new drive device for driving a generator in a wind turbine.

BRIEF SUMMARY OF THE INVENTION

An embodiment of the disclosure meets the needs presented above by generally comprising a first housing that is coupled a top end of a stanchion. A drive unit is rotatably positioned in the first housing. A plurality of wind propellers is coupled to the drive unit thereby facilitating the wind propellers to rotate the drive unit. A planetary driven unit is rotatably positioned in the first housing. The planetary driven unit is in mechanical communication with the drive unit such that the drive unit rotates the planetary driven unit when the wind propellers rotate the drive unit. The planetary driven unit is mechanically discrete from the first housing. Thus, the planetary driven unit inhibits the first housing from being exposed to rotational torque. The planetary driven unit is coupled to a generator thereby facilitating the wind propellers to rotate the generator.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 10 thereof, a new drive device embodying the principles and concepts of an embodiment of the disclosure and generally designated by the reference numeral 10 will be described.

As best illustrated in FIGS. 1 through 10, the planetary drive assembly 10 generally comprises a first housing 12 that is coupled to a top end of a stanchion. In this way the first housing 12 is elevated above ground. The stanchion may be a pole of a wind generator 100 or the like. The first housing 12 has a first end 14, a second end 16 and an outer wall 18 extending therebetween. The outer wall 18 is continuous such that the first housing 12 has a cylindrical shape. The first housing 12 is substantially hollow and each of the first end 14 and the second end 16 is open. Additionally, the outer wall 54 18 has an interior surface 20.

A tube 22 is positioned within the first housing 12 and the first housing 12 has a plurality of interior walls 24. Each of the interior walls 24 extends between the interior surface 20 of the first housing 12 and the tube 22. In this way the tube 22 is centrally positioned in the first housing 12 and the tube 22 is oriented collinear with the first housing 12. The tube 22 is positioned closer to the second end 16 of the first housing 12 than the first end of the first housing 12.

A drive unit 26 is provided and the drive unit 26 is rotatably positioned in the first housing 12. The drive unit 26 is coupled to a plurality of wind propellers 28. In this way the wind propellers 28 rotate the drive unit 26. The plurality of wind propellers 28 may be wind propellers common to wind turbines or the like.

The drive unit 26 comprises a first shaft 30 that has a primary end 32, a secondary end 34 and an outer surface 36 extending therebetween. The outer surface 36 has a plurality of first indentations 38 extending inwardly therein and the first indentations 38 are spaced apart from each other and are distributed around the first shaft 30. Each of the first indentations 38 extends from the primary end 32 toward the secondary end 34 to define a plurality of first teeth 40 on the first shaft 30. The outer surface 36 has a plurality of second indentations 42 extending inwardly therein. The second indentations 42 are spaced apart from each other and are distributed around the first shaft 30. The second indentations 42 extend from the secondary end 34 toward the primary end 32 to define a plurality of second teeth 44 on the first shaft 30.

The first shaft 30 is positioned in the tube 22 having the secondary end 34 extending outwardly from the second end 16 of the first housing 12. The primary end 32 of the first shaft 30 is directed toward the first end 14 of the first housing 12. The secondary end 34 of the first shaft 30 is coupled to the wind propellers 28. The first end 14 has a primary well 46 extending toward the second end 16 and the outer surface 36 has a secondary well 48 extending inwardly therein. The secondary well 48 intersects the primary well 46. Moreover, the secondary well 48 receives a lubricant thereby facilitating the lubricant to travel through the primary well 46.

A cap 50 is provided that has a first wall 52 and an outer wall 54. The outer wall 54 of the cap 50 is continuous such that the cap 50 has a circular shape and the outer wall 54 of the cap 50 has a distal edge 56 with respect to the first wall 52. The first wall 52 has an opening 58 extending therethrough. The distal edge 56 of the cap 50 abuts the second end 16 of the first housing 12 and the first shaft 30 extends through the opening 58. A lip 60 extends outwardly from the outer wall 54 and the lip 60 is aligned with the distal edge 56.

A plurality of first fasteners 62 extends through the lip 60 and engages the second end 16 of the first housing 12 to retain the cap 50 on the first housing 12. A plurality of first bearings 64 is provided and each of the first bearings 64 is positioned between the tube 22 and the outer surface 36 of the first shaft 30. In this way the first shaft 30 is rotatable in the tube 22. Each of the first bearings 64 may comprise friction reducing ball bearing 141s or the like.

A second housing 66 is provided that has a first end 68, a second end 70 and an outside wall 72 extending therebetween. The outside wall 72 is continuous such that the second housing 66 has a cylindrical shape. The second housing 66 is positioned within the first housing 12 and the outside wall 72 of the second housing 66 is spaced from the outer wall 54 of the first housing 12. Moreover, the second housing 66 extends between the tube 22 in the first housing 12 and the first end 14 of the first housing 12. The outside wall 72 has an inner surface 74 and an outer surface 76.

The outside wall 72 has a first surface 73 that is vertically oriented between a first half 75 and a second half 78 of the second housing 66. The first half 75 of the second housing 66 has a diameter is greater than a diameter of the second half 78 of the second housing 66. The first surface 73 is positioned closer to the second end 70 of the second housing 66 than the first end 68 of the second housing 66. The first end 68 of the second housing 66 has a first well 80 extending toward the second end of the second housing 66. The second end 70 of the second housing 66 has a second well 82 extending toward the first end of the second housing 66.

Each of the first well 80 and the second well 82 has a bounding surface 84. The bounding surface 84 of the first well 80 has a plurality of primary indentations 86 extending outwardly therein. The primary indentations 86 extend from the first end 68 of the second housing 66 toward the second end 70 of the second housing 66. Each of the primary indentations 86 is spaced apart from each other and is distributed around the first well 80 to define a plurality of primary teeth 88 in the second housing 66.

The bounding surface 84 of the first well 80 has a plurality of secondary indentations 90 extending outwardly therein. The secondary indentations 90 are spaced from the primary indentations 86. Each of the secondary indentations 90 is oriented collinear with the primary indentations 86. Moreover, the secondary indentations 90 are spaced apart from each other and are distributed around the first well 80 to define a plurality of secondary teeth 92 in the second housing 66.

The bounding surface 84 of the second well 82 has a plurality of tertiary indentations 94 extending outwardly therein. Each of the tertiary indentations 94 extends from the second end 70 of the second housing 66 toward the first end 68 of the second housing 66. The tertiary indentations 94 are spaced apart from each other and are distributed around the second well 82 to define a plurality of tertiary teeth 96 in the second housing 66. Moreover, the plurality of first teeth 40 on the first shaft 30 engages the plurality of tertiary teeth 96 on the second housing 66. In this way the first shaft 30 rotates the second housing 66 when the wind propellers 28 rotate the first shaft 30.

A planetary driven unit 98 is provided and the planetary driven unit 98 is rotatably positioned in the first housing 12. The planetary driven unit 98 is in mechanical communication with the drive unit 26. Thus, the drive unit 26 rotates the planetary driven unit 98 when the wind propellers 28 rotate the drive unit 26. The planetary driven unit 98 is mechanically discrete from the first housing 12. Thus, the planetary driven unit 98 inhibits the first housing 12 from being exposed to rotational torque.

Conventional wind turbine designs have an outer housing that is exposed to the rotational torque of the wind propellers 28. The outer housing is a common failure point on conventional wind turbines. The planetary drive unit 26 improves the service life of wind turbines by eliminating the common failure point in the conventional wind turbine design. Moreover, the planetary driven unit 98 is coupled to a generator 100 thereby facilitating the wind propellers 28 to rotate the generator 100. The generator 100 may be a wind turbine generator 100 or the like.

The planetary driven unit 98 comprises a third housing 102 that has a first end 103, a second end 104 and an outermost wall 105 extending therebetween. The outermost wall 105 is continuous such that the third housing 102 has a cylindrical shape and the third housing 102 is substantially hollow. The first end 103 of the third housing 102 has a first aperture 106 extending into an interior of the third housing 102. The first aperture 106 is centrally positioned on the first end 103 of the third housing 102.

The second end 104 of the third housing 102 has a second aperture 107 extending into the interior of the third housing 102 and the second aperture 107 is aligned with the first aperture 106. The first end 103 of the third housing 102 has a plurality of third apertures 108 each extending into the interior of the third housing 102. Each of the third apertures 108 is spaced apart from each other and is distributed around the first aperture 106. The second end 104 of the third housing 102 has a plurality of fourth apertures 109 each extending into the interior of the third housing 102. Each of the fourth apertures 109 is aligned with an associated one of the third apertures 108.

The outermost wall 105 has a plurality of fifth apertures 110 each extending into the interior of the third housing 102. The fifth apertures 110 are spaced apart from each other and are distributed around the outermost wall 105. The third housing 102 is positioned within the second housing 66 having the outermost wall 105 being spaced from the outside wall 72 of the second housing 66. Each of the fifth apertures 110 is aligned with the secondary teeth 92 in the second housing 66.

A plurality of second shafts 112 is provided and each of the second shafts 112 has a first end 113 and a second end 114. Each of the second shafts 112 extends through an associated pair of the third 108 and fourth 109 apertures in the third housing 102. A plurality of first gears 115 is provided and each of the first gears 115 is positioned around an associated one of the second shafts 112. Each of the first gears 115 is positioned in an associated one of the fifth apertures 110 in the third housing 102. The first gear 115 corresponding to each of the second shafts 112 engages the secondary teeth 92 in the second housing 66. Thus, the second housing 66 rotates each of the second shafts 112 having each of the second shafts 112 orbiting about an axis extending through the first 103 and second ends 104 of the third housing 102. Each of the first gears 115 is continuously aligned with the associated fifth aperture 110 when the third housing 102 rotates.

A plurality of second gears 116 is provided and each of the second gears 116 is positioned around an associated one of the second shafts 112. Each of the second gears 116 is positioned in an associated one of the fifth apertures 110 in the third housing 102. Moreover, each of the second gears 116 is positioned between the first end 113 of the associated second shaft 112 and the corresponding first gear 115. Each of the second gears 116 is continuously aligned with the associated fifth aperture 110 when the third housing 102 rotates.

A fourth housing 118 is provided that has a first end 119, a second end 120 and an exterior wall 121 extending therebetween. The exterior wall 121 is continuous such that the fourth housing 118 has a cylindrical shape and the fourth housing 118 is substantially hollow. The first end 119 of the fourth housing 118 has a sixth aperture 122 extending into an interior of the fourth housing 118. The sixth aperture 122 is centrally positioned on the first end 119 of the fourth housing 118. The second end 120 of the fourth housing 118 has a seventh aperture 123 extending into the interior of the fourth housing 118. The seventh aperture 123 is aligned with the sixth aperture 122.

The exterior wall 121 has a plurality of eighth apertures 124 each extending into the interior of the fourth housing 118. The eighth apertures 124 are spaced apart from each other and are distributed around the exterior wall 121. The fourth housing 118 extends into the first well 80 in the second housing 66 and the first end 119 of the fourth housing 118 is aligned with the first end 14 of the first housing 12. Moreover, the second end 119 of the fourth housing 118 is spaced from the first end 103 of the third housing 102 and the seventh aperture 123 is aligned with the first aperture 106 in the third housing 102.

A third shaft 125 is positioned in the first well 80 in the second housing 66. A second bearing 126 is positioned around the third shaft 125 and the second bearing 126 engages the second housing 66. The second bearing 126 may be a friction reducing ball bearing 141 or the like. A third bearing 128 is positioned around the third shaft 125. The third bearing 128 engages a bounding surface of the second aperture 107 in the third housing 102. The third bearing 128 may be a friction reducing ball bearing 141 or the like.

A third gear 129 is positioned around the third shaft 125. The third gear 129 is positioned within the first well 80 in the second housing 66. Each of the first gears 115 engages the third gear 129. Thus, the third gear 129 defines a sun gear with respect to planetary gears defined by the first gears 115.

A fourth shaft 130 is provided that has a first end 131 and a second end 132. The fourth shaft 130 is positioned in the first well 80 in the second housing 66. The fourth shaft 130 extends through the first aperture 106 in the third housing 102. Additionally, the fourth shaft 130 extends through each of the sixth 122 and seventh 123 apertures in the fourth housing 118. The first end 131 of the fourth shaft 130 is directed outwardly from the fourth housing 118. The first end 131 of the fourth shaft 130 is coupled to the generator 100.

A fourth bearing 133 is positioned around the fourth shaft 130 and the fourth bearing 133 engages a bounding surface of the first aperture 106 in the third housing 102. The fourth bearing 133 may be a friction reducing ball bearing 141 or the like. A fifth bearing 134 is positioned around the fourth shaft 130. The fifth bearing 134 engages a bounding surface of the sixth aperture 122 in the fourth housing 118. Additionally, the fifth bearing 134 may be a friction reducing ball bearing 141 or the like.

A fourth gear 135 is provided and the fourth gear 135 is positioned around the fourth shaft 130. The fourth gear 135 is aligned with the second end 132 of the fourth shaft 130. Moreover, the fourth gear 135 is positioned within the first well 80 in the second housing 66. The fourth gear 135 is aligned with the plurality of fifth apertures 110 in the third housing 102.

Each of the second gears 116 engages the fourth gear 135 such that the fourth gear 135 defines a sun gear with respect to planetary gears defined by the second gears 116. Each of the second shafts 112 rotates the fourth shaft 130 when the wind propellers 28 rotate the first shaft 30. Moreover, each of the second gears 116 transfers rotational torque between the first gears 115 and the fourth gear 135. The fourth shaft 130 rotates at a speed that is greater than a rotational speed of the second housing 66. A fifth gear 136 is positioned around the fourth shaft 130 and the fifth gear 136 is aligned with the plurality of eighth apertures 124 in the fourth housing 118.

A plurality of fifth shafts 137 is provided and each of the fifth shafts 137 is positioned within the fourth housing 118. Each of the fifth shafts 137 has a first end 138 and a second end 139. The first end 138 corresponding to each of the fifth shafts 137 engages the first end 119 of the fourth housing 118. The second end 139 corresponding to each of the fifth shafts 137 engages the second end 120 of the fourth housing 118. Each of the fifth shafts 137 is spaced apart from each other and is distributed around the sixth 122 and seventh 123 apertures in the fourth housing 118.

A plurality of sixth gears 140 is provided and each of the sixth gears 140 is positioned around an associated one of the fifth shafts 137. Each of the sixth gears 140 is aligned with an associated one of the eighth apertures 124 in the fourth housing 118. Moreover, each of the sixth gears 140 engages the fifth gear 136. Thus, each of the sixth gears 140 defines a plurality of planetary gears with respect to a sun gear defined by the fifth gear 136. Each of the sixth gears 140 engages the primary teeth 88 in the second housing 66.

A ring 141 is provided that has a first surface 142 and a second surface 143. The first surface 142 rotatably engages the first end 119 of the fourth housing 118. The first surface 142 abuts the first end 14 of the first housing 12. A plurality of second fasteners 145 is provided and each of the second fasteners 145 extends through the first 142 and second 143 surfaces of the ring 141. Each of the second fasteners 145 engages the first end 14 of the first housing 12 to retain the ring 141 on the first housing 12.

Figure 1:
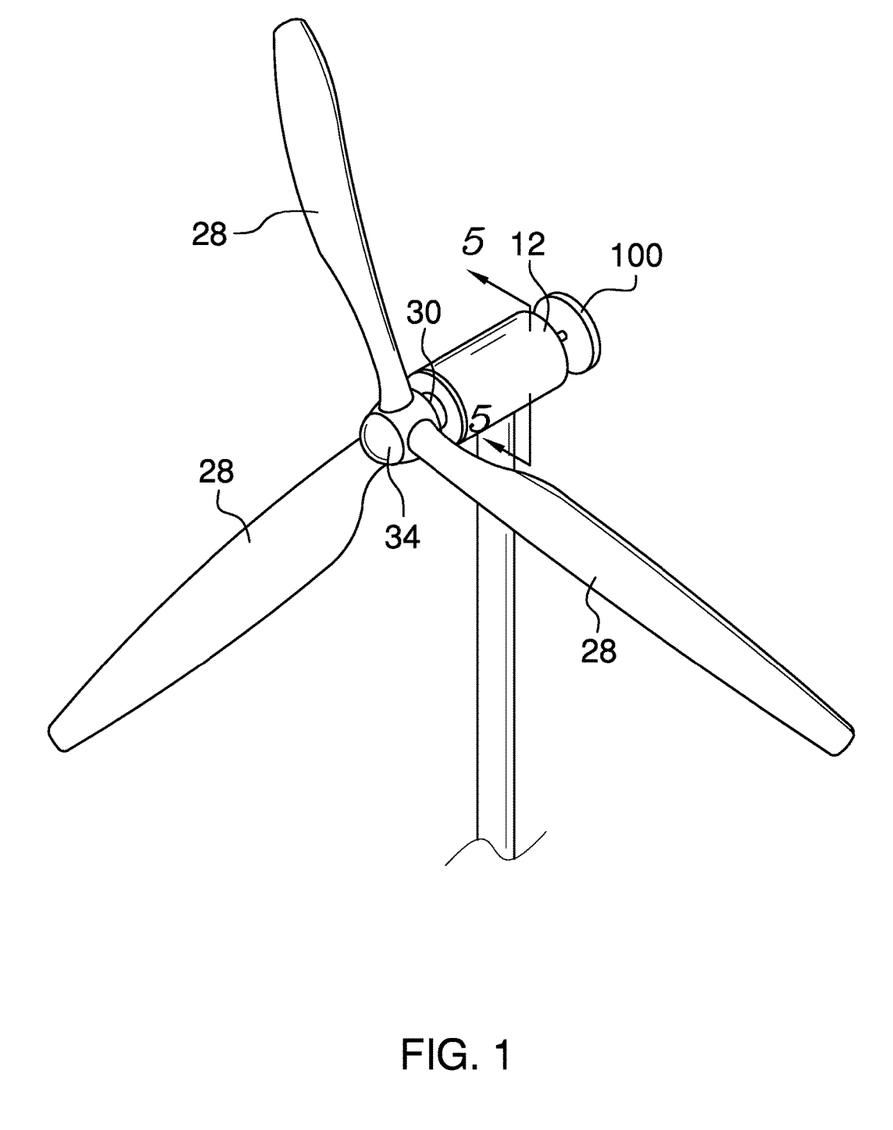
FIG. 1 is a phantom perspective view of a planetary drive assembly according to an embodiment of the disclosure.
Figure 2:
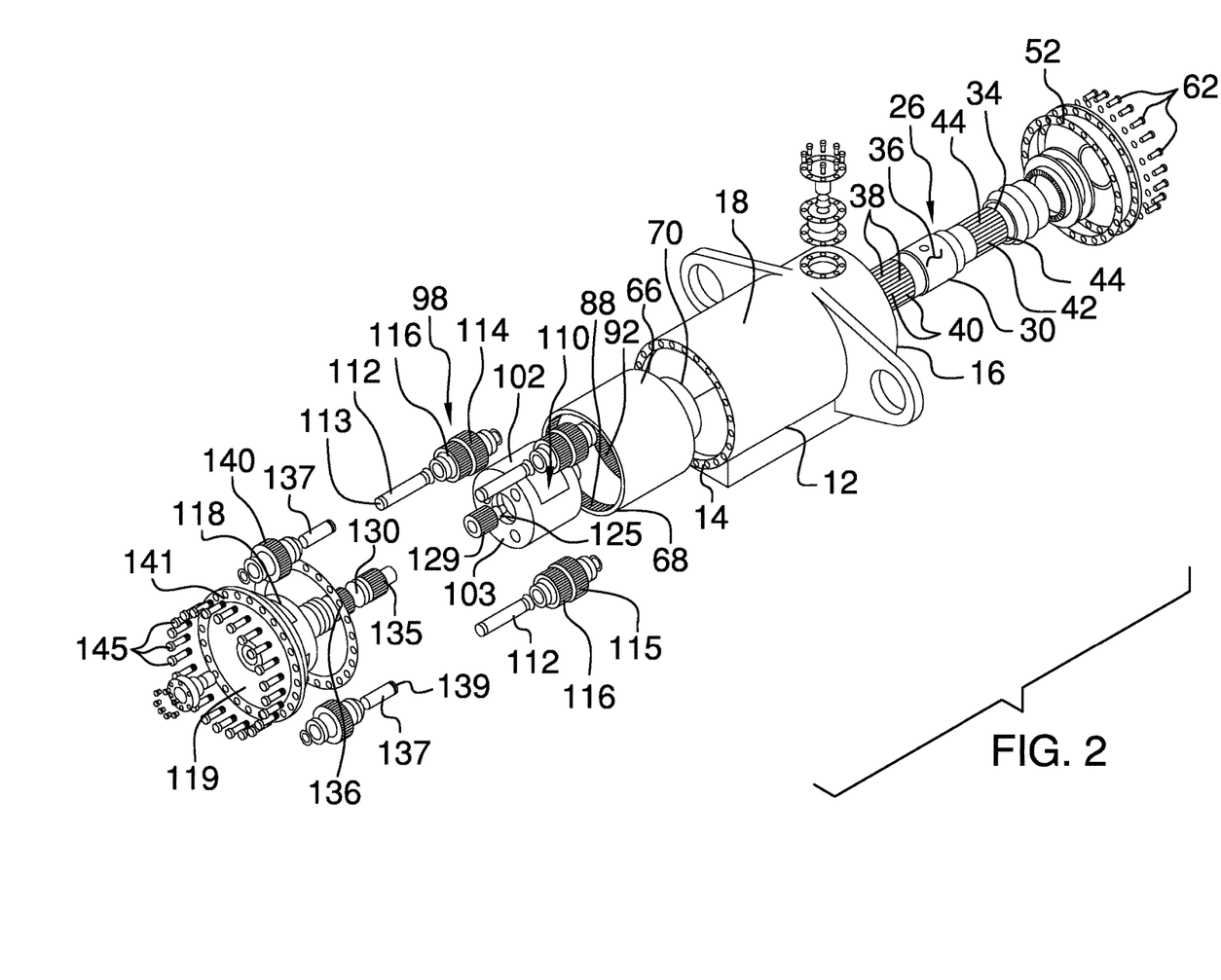
FIG. 2 is an exploded perspective view of an embodiment of the disclosure.
Figure 3:
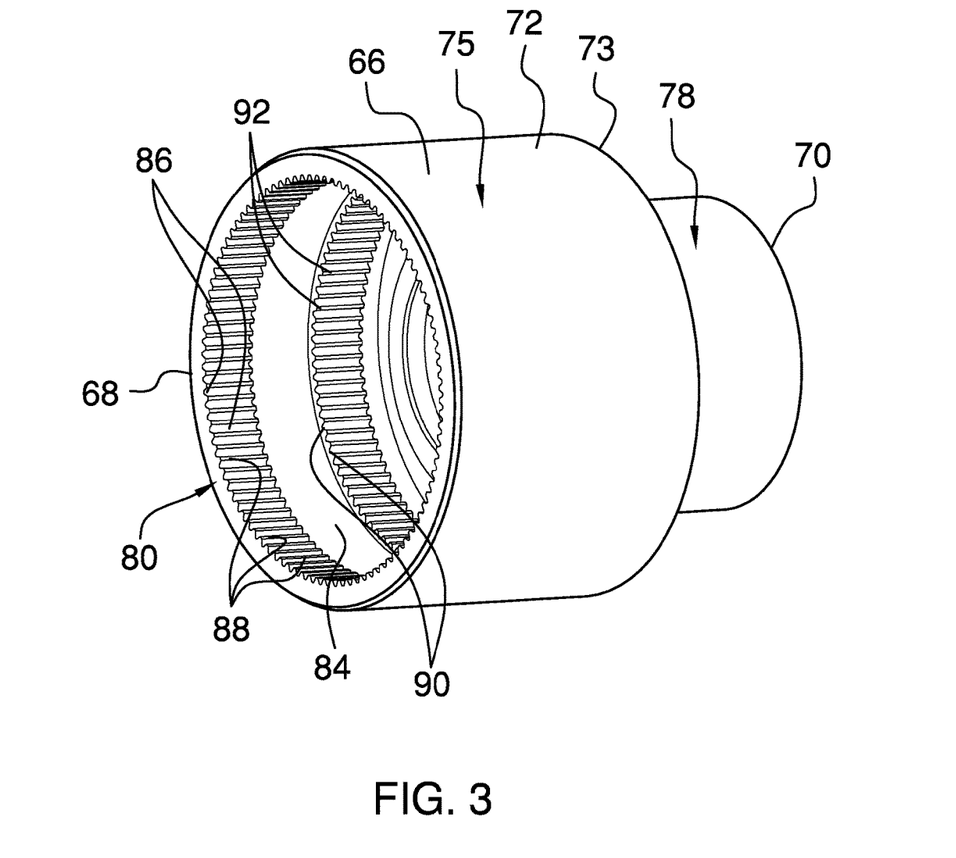
FIG. 3 is a front perspective view of a second housing of an embodiment of the disclosure.
Figure 4:
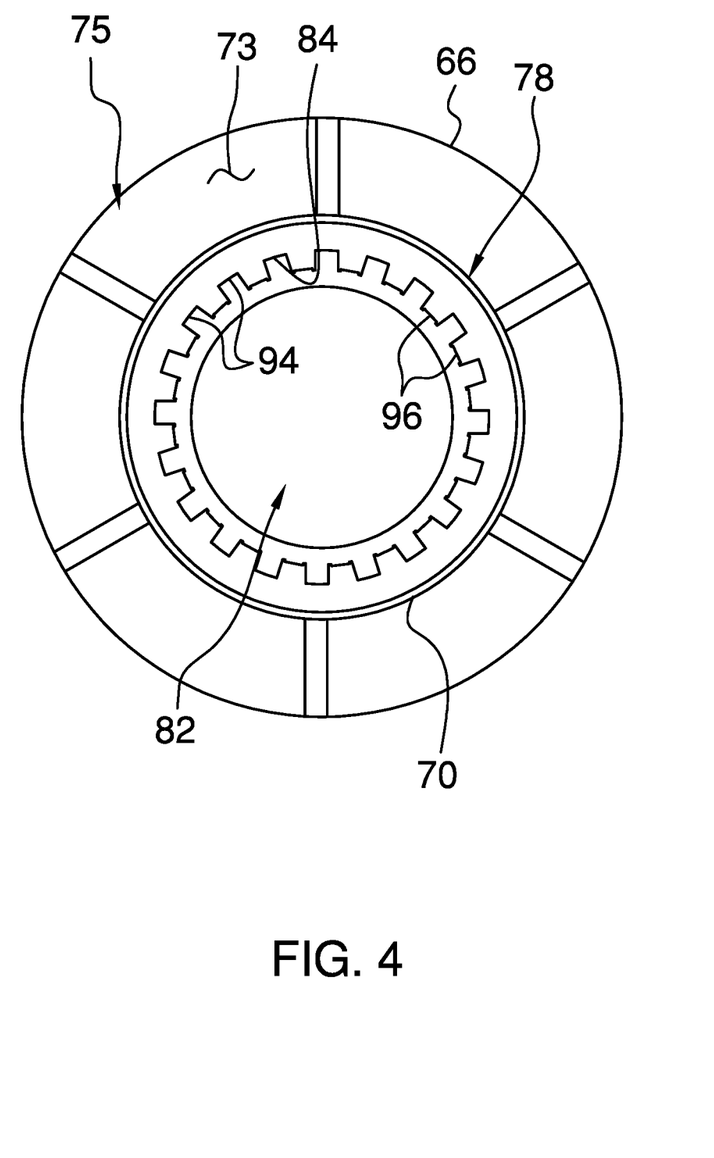
FIG. 4 is a back view of a second housing of an embodiment of the disclosure.
Figure 5:
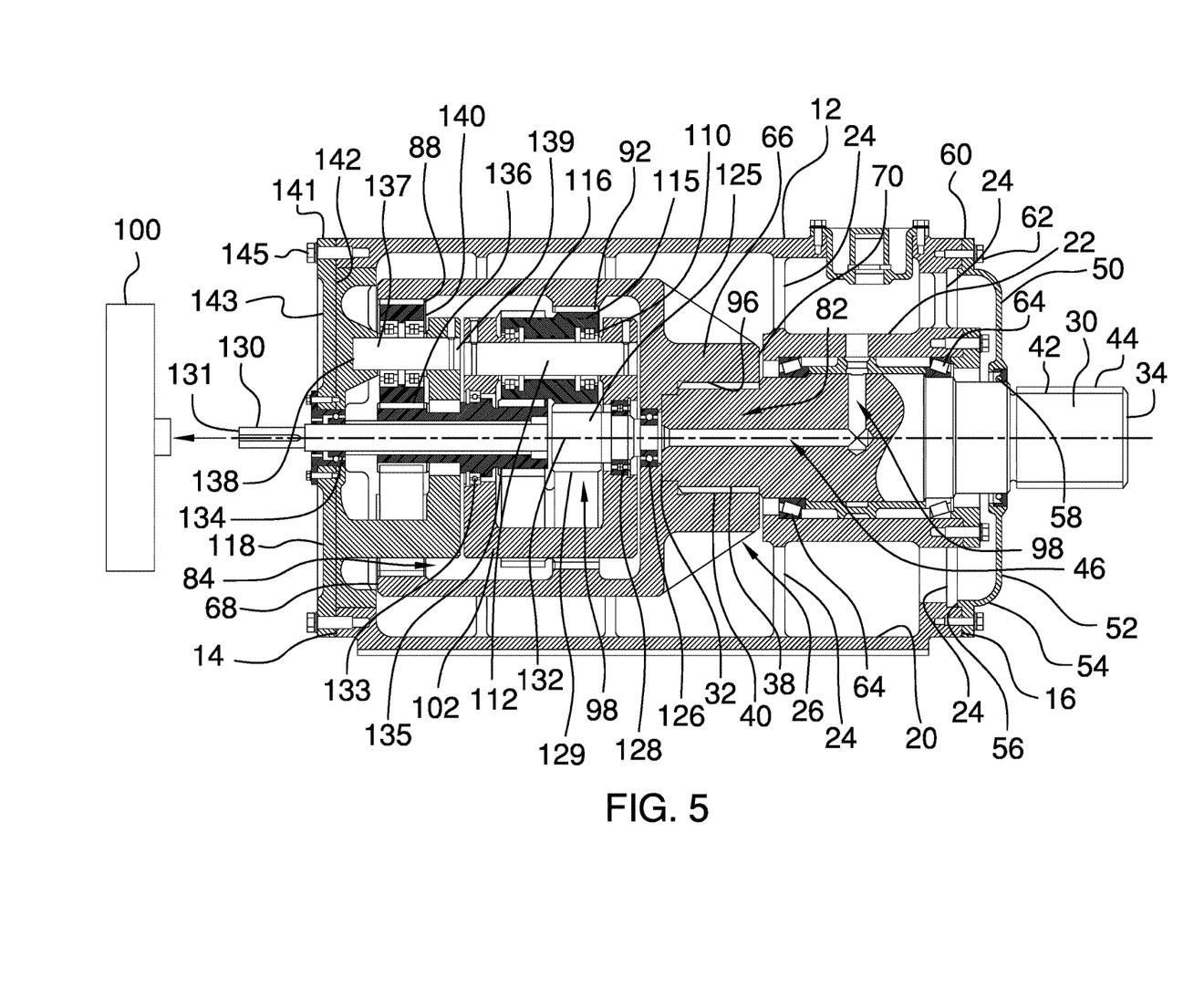
FIG. 5 is a cross sectional view taken along line 5-5 of FIG. 1 of an embodiment of the disclosure.
Figure 6:
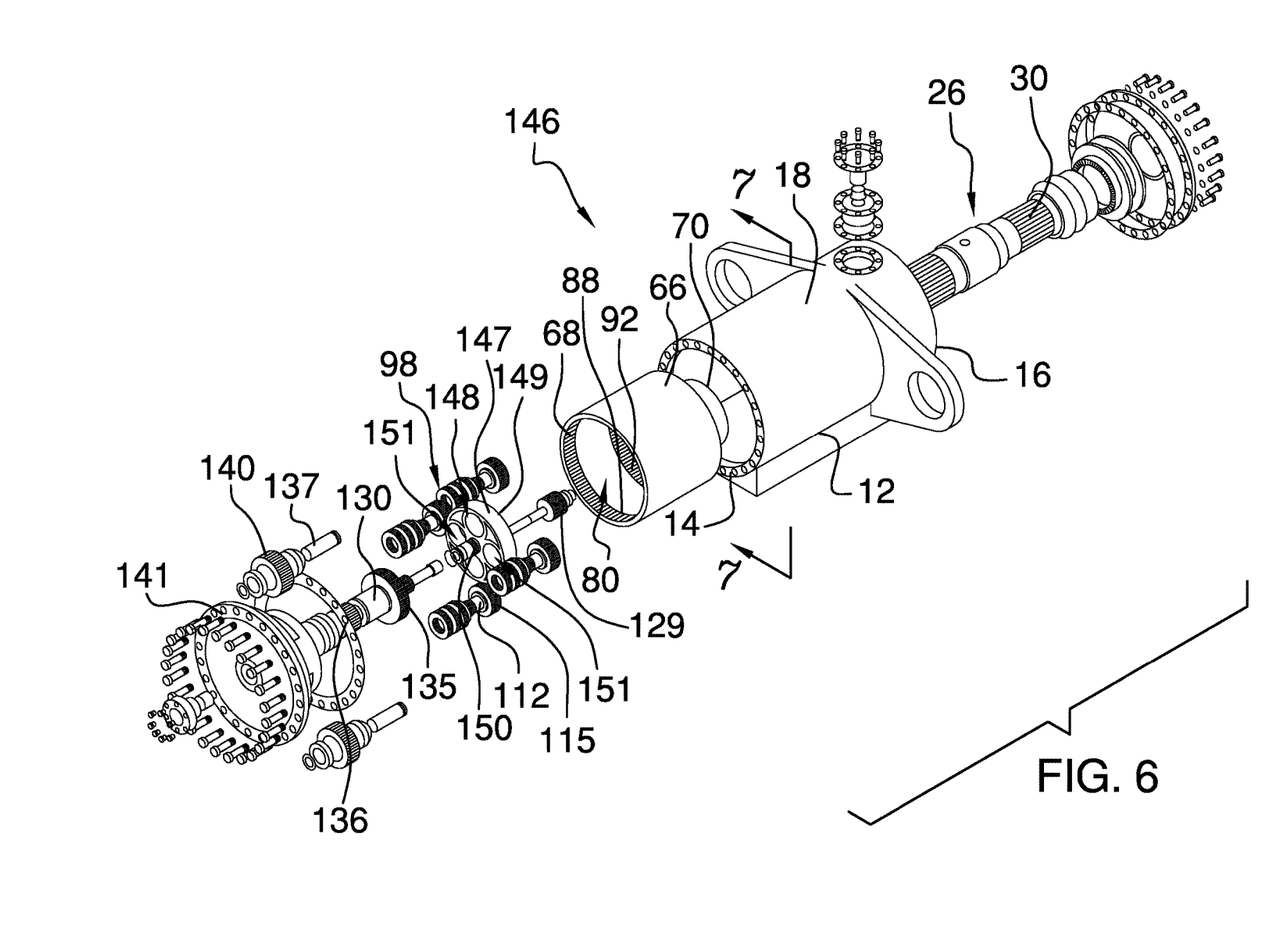
FIG. 6 is an exploded perspective view of an alternative embodiment of the disclosure.
Figure 7:
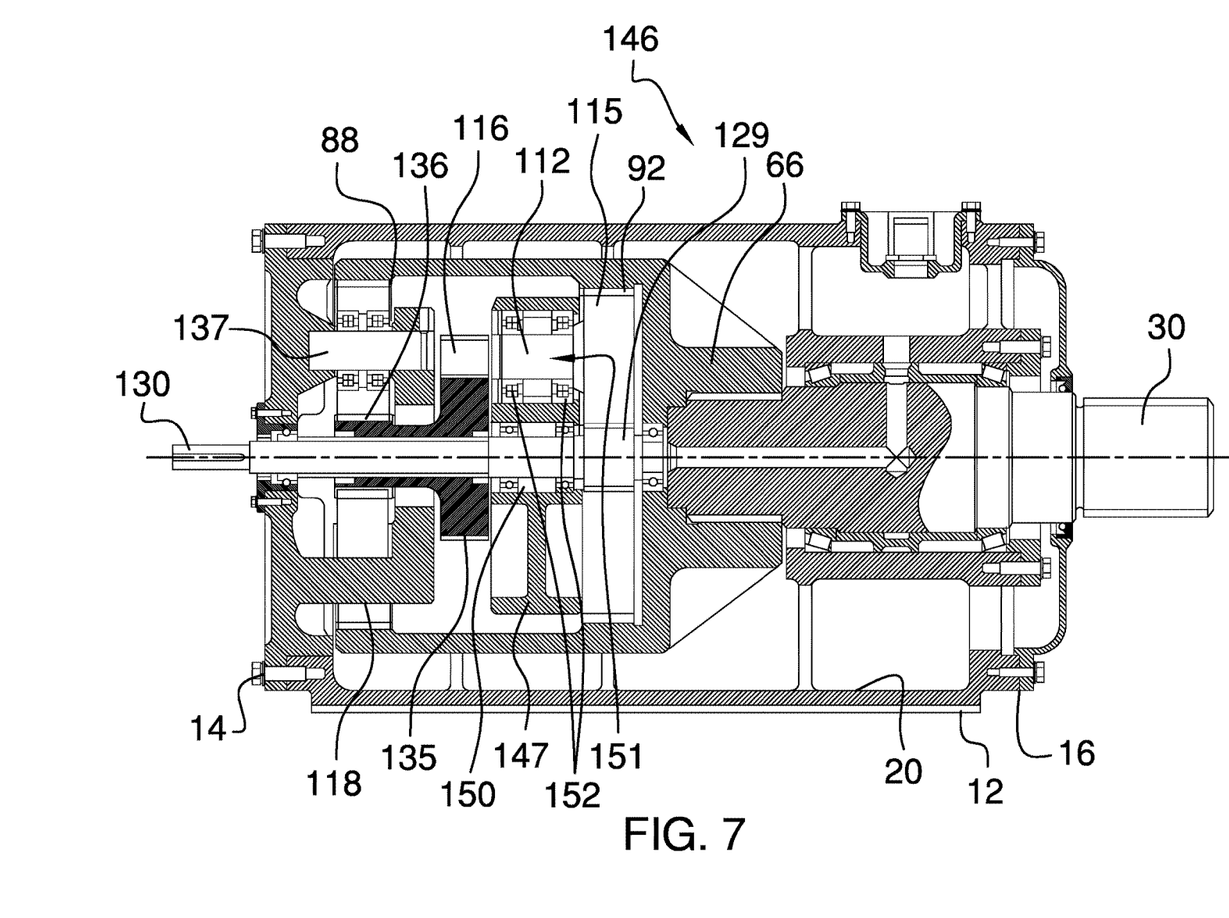
FIG. 7 is a cross sectional view taken along line 7-7 of FIG. 6 of an alternative embodiment of the disclosure.
Figure 8:
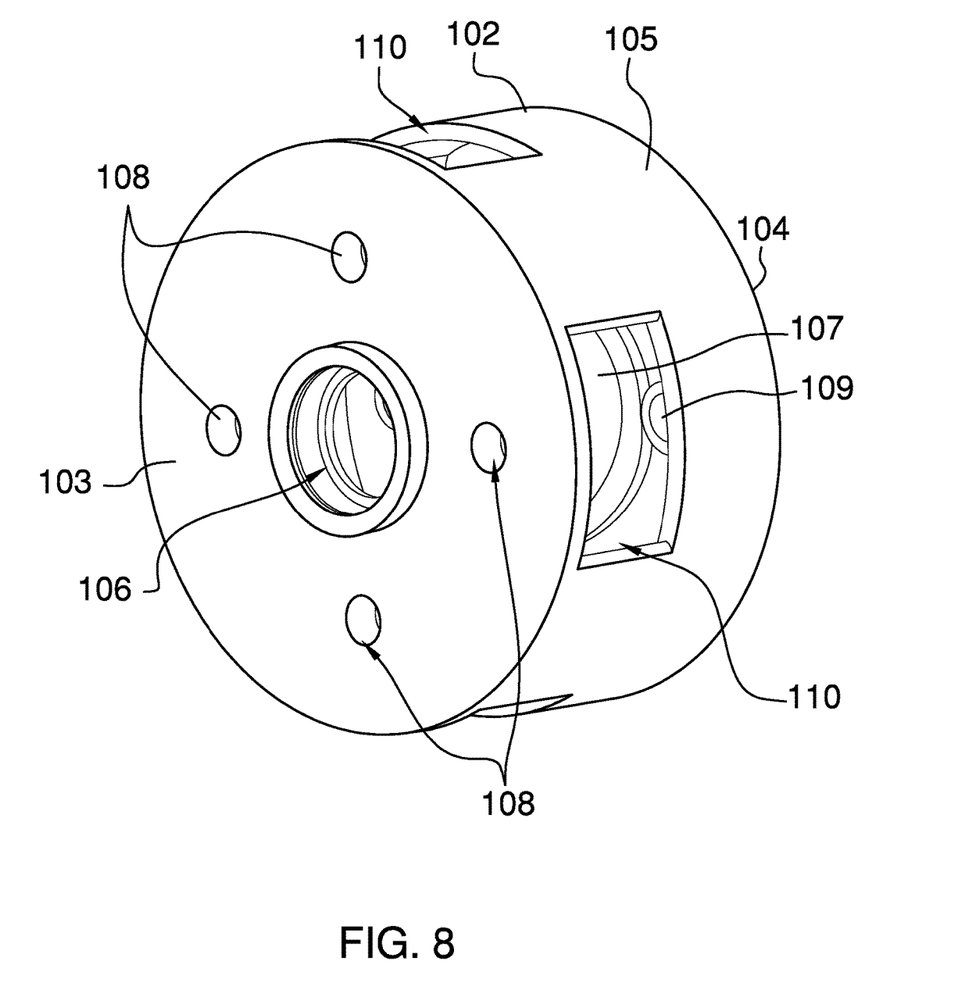
FIG. 8 is a phantom perspective view of a third housing of an embodiment of the disclosure.
Figure 9:
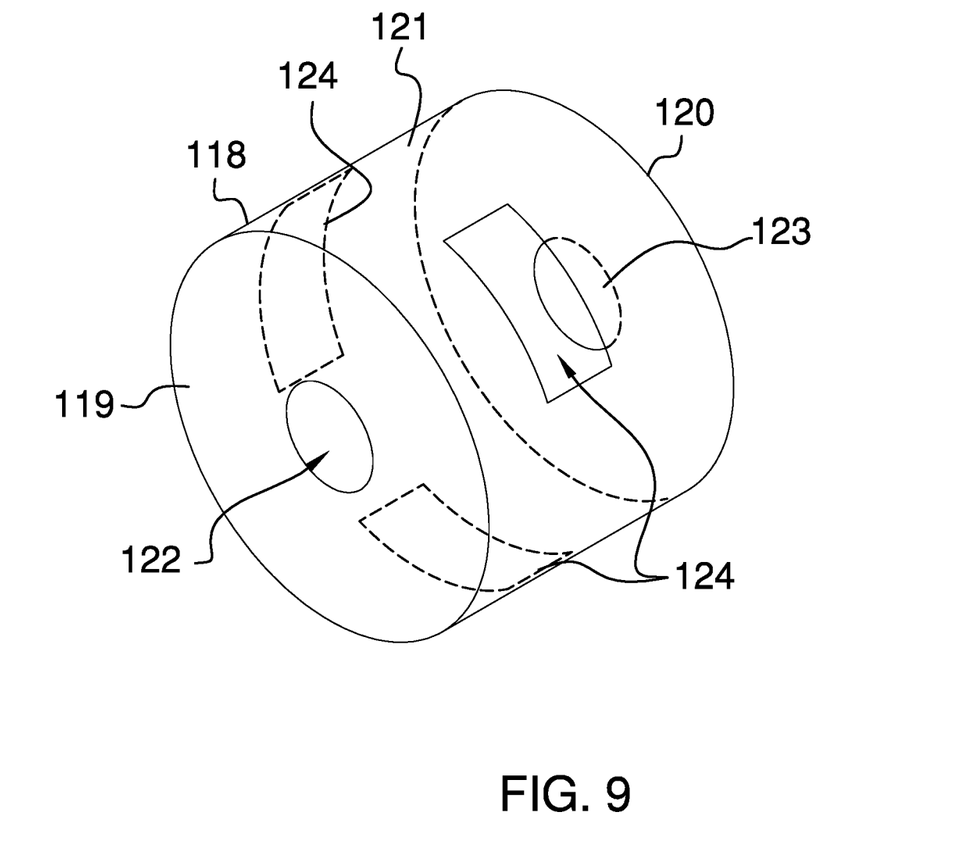
FIG. 9 is a phantom perspective view of a fourth housing of an embodiment of the disclosure.
Figure 10:
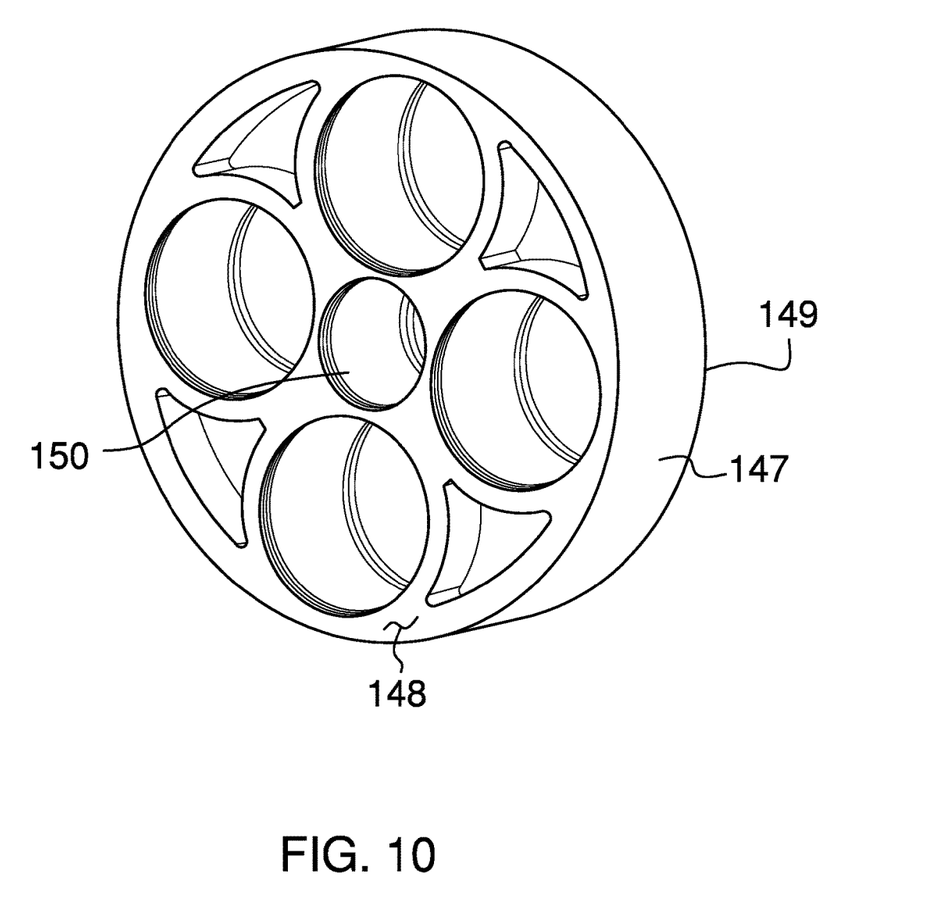
FIG. 10 is a perspective view of a disk of an alternative embodiment of the disclosure.

In an alternative embodiment 146 as shown in FIGS. 6 and 7 the third housing 102 may be absent from the planetary driven unit 98. A disk 147 may be provided in lieu of the third housing 102. The disk 147 may have a first surface 148 and a second surface 149. The disk 147 may have a first hole 150 extending through the first 148 and second 149 surfaces of the disk 147. The first hole 150 may be centrally positioned on the disk 147. The disk 147 may have a plurality of second holes 151 each extending through the first 148 and second 149 surfaces. The second holes 151 may be spaced apart from each other and be distributed around the first hole 150.

The third shaft 125 may be absent in the alternative embodiment and the third gear 129 may be positioned around the fourth shaft 130. The fourth shaft 130 may extend through the first hole 150 in the disk 147. Moreover, the fourth shaft 130 may extend into the first well 80 in the second housing 66 and the second bearing 126 may engage the fourth shaft 130. In this way the disk 147 may be positioned in the first well 80 in the second housing 66.

Each the second shafts 112 may extend through an associated one of the second holes 151 in the disk 147. A plurality of sixth bearings 152 may be provided and each of the sixth bearings 152 may be positioned around an associated one of the second shafts 112. Each of the sixth bearings 152 may engage a bounding surface of an associated one of the second holes 151. Each of the sixth bearings 152 may be friction reducing ball bearings or the like.

In use, the first housing 12 is attached to the top end of the stanchion. Each of the wind propellers 28 are attached to the secondary end 34 of the first shaft 30. The first end of the fourth shaft 130 is coupled to the generator 100. The wind propellers 28 rotate the first shaft 30 when wind urges each of the wind propellers 28. The planetary drive unit 26 transfers the rotational torque of the first shaft 30 into the fourth shaft 130. Moreover, the planetary drive unit 26 inhibits the first housing 12 from being exposed to the rotational torque. In this way a service life of the drive unit 26 is enhanced by removing the first housing 12 from the torque pathway as compared to conventional wind turbine drive units.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A planetary drive assembly being configured to transfer rotational torque between a plurality of wind propellers and a generator, said assembly comprising:
   a first housing being coupled to a top end of a stanchion wherein said first housing is configured to be elevated above ground;
   a drive unit being rotatably positioned in said first housing, said drive unit being configured to have the plurality of wind propellers being coupled thereto thereby facilitating the wind propellers to rotate said drive unit;
   a planetary driven unit being rotatably positioned in said first housing, said planetary driven unit being in mechanical communication with said drive unit such that said drive unit rotates said planetary driven unit when the wind propellers rotate said drive unit, said planetary driven unit being mechanically discrete from said first housing such that said planetary driven unit inhibits said first housing from being exposed to rotational torque, said planetary driven unit being configured to be coupled to a generator thereby facilitating the wind propellers to rotate the generator;
   said first housing having a first end, a second end and an outer wall extending therebetween, said outer wall being continuous such that said first housing has a cylindrical shape, said first housing being substantially hollow, each of said first end and said second end being open, said outer wall having an interior surface;
   a tube being positioned within said first housing, said first housing having a plurality of interior walls, each of said interior walls extending between said interior surface of said first housing and said tube such that said tube is centrally positioned in said first housing having said tube being oriented collinear with said first housing, said tube being positioned closer to said second end of said first housing than said first end of said first housing; and
   wherein said drive unit comprises:
      a first shaft having a primary end, a secondary end and an outer surface extending therebetween;
      said outer surface having a plurality of first indentations extending inwardly therein, said first indentations being spaced apart from each other and being distributed around said first shaft, each of said first indentations extending from said primary end toward said secondary end to define a plurality of first teeth on said first shaft;
      said outer surface having a plurality of second indentations extending inwardly therein, said second indentations being spaced apart from each other and being distributed around said first shaft, said second indentations extending from said secondary end toward said primary end to define a plurality of second teeth on said first shaft;
      said first shaft being positioned in said tube having said secondary end extending outwardly from said second end of said first housing and having said primary end being directed toward said first end of said first housing, said secondary end of said first shaft being configured to be coupled to the wind propellers;

said first end having a primary well extending toward said second end; and said outer surface having a secondary well extending inwardly therein, said secondary well intersecting said primary well wherein said secondary well is configured to receive a lubricant thereby facilitating the lubricant to travel through said primary well.

2. The assembly according to claim 1, further comprising:

a second housing having a first end, a second end and an outside wall extending therebetween, said outside wall being continuous such that said second housing has a cylindrical shape, said second housing being positioned within said first housing having said outside wall of said second housing being spaced from said outer wall of said first housing, said second housing extending between said tube in said first housing and said first end of said first housing, said outside wall having an inner surface and an outer surface;

said outside wall having a first surface being vertically oriented between a first half and a second half of said second housing such that said first half has a diameter being greater than a diameter of said second half, said first surface being positioned closer to said second end of said second housing than said first end of said second housing.

3. The assembly according to claim 2, wherein:

said first end of said second housing has a first well extending toward said second end of said second housing;

said second end of said second housing has a second well extending toward said first end of said second housing, each of said first well and said second well having a bounding surface;

said bounding surface of said first well has a plurality of primary indentations extending outwardly therein, said primary indentations extending from said first end of said second housing toward said second end of said second housing, each of said primary indentations being spaced apart from each other and being distributed around said first well to define a plurality of primary teeth in said second housing;

said bounding surface of said first well has a plurality of secondary indentations extending outwardly therein, said secondary indentations being spaced from said primary indentations, each of said secondary indentations being oriented collinear with said primary indentations, said secondary indentations being spaced apart from each other and being distributed around said first well to define a plurality of secondary teeth in said second housing; and said bounding surface of said second well having a plurality of tertiary indentations extending outwardly therein, each of said tertiary indentations extending from said second end of said housing toward said first end of said second housing, said tertiary indentations being spaced apart from each other and being distributed around said second well to define a plurality of tertiary teeth in said second housing, said plurality of first teeth on said first shaft engaging said plurality of tertiary teeth on said second housing such that said first shaft rotates said second housing.

4. The assembly according to claim 3, wherein said planetary driven unit comprises:

a third housing having a first end, a second end and an outermost wall extending therebetween, said outermost wall being continuous such that said third housing has a cylindrical shape, said third housing being substantially hollow;

said first end of said third housing having a first aperture extending into an interior of said third housing, said first aperture being centrally positioned on said first end of said third housing;

said second end having a second aperture extending into said interior of said third housing, said second aperture being aligned with said first aperture;

said first end of said third housing having a plurality of third apertures each extending into said interior of said third housing, each of said third apertures being spaced apart from each other and being distributed around said first aperture;

said second end of said third housing having a plurality of fourth apertures each extending into said interior of said third housing, each of said fourth apertures being aligned with an associated one of said third apertures;

said outermost wall having a plurality of fifth apertures each extending into said interior of said third housing, said fifth apertures being spaced apart from each other and being distributed around said outermost wall, said third housing being positioned within said second housing having said outermost wall being spaced from said outside wall of said second housing, each of said fifth apertures being aligned with said secondary teeth in said second housing.

5. The assembly according to claim 4, further comprising a plurality of second shafts, each of said second shafts having a first end and a second end, each of said second shafts extending through an associated pair of said third and fourth apertures in said third housing.

6. The assembly according to claim 5, further comprising a plurality of first gears, each of said first gears being positioned around an associated one of said second shafts, each of said first gears being positioned in an associated one of said fifth apertures in said third housing, said first gear corresponding to each of said second shafts engaging said secondary teeth in said second housing such that said second housing rotates each of said second shafts having each of said second shafts orbiting about an axis extending through said first and second ends of said third housing, each of said first gears being continuously aligned with said associated fifth aperture when said third housing rotates.

7. The assembly according to claim 5, further comprising a plurality of second gears, each of said second gears being positioned around an associated one of said second shafts, each of said second gears being positioned in an associated one of said fifth apertures in said third housing, each of said second gears being positioned between said first end of said associated second shaft and said corresponding first gear, each of said second gears being continuously aligned with said associated fifth aperture when said third housing rotates.

8. The assembly according to claim 4, further comprising:

a fourth housing being spaced from said third housing, said fourth housing having a first end, a second end and an exterior wall extending therebetween, said exterior wall being continuous such that said fourth housing has a cylindrical shape, said fourth housing being substantially hollow;

said first end of said fourth housing having a sixth aperture extending into an interior of said fourth housing, said sixth aperture being centrally positioned on said first end of said fourth housing; and said second end of said fourth housing having a seventh aperture extending into said interior of said fourth housing, said seventh aperture being aligned with said sixth aperture.

9. The assembly according to claim 8, wherein:
said exterior wall has a plurality of eighth apertures each extending into said interior of said fourth housing, said eighth apertures being spaced apart from each other and being distributed around said exterior wall; and
said fourth housing extending into said first well in said second housing having said first end of said fourth housing being aligned with said first end of said first housing, said second end of said fourth housing being spaced from said first end of said third housing having said seventh aperture being aligned with said first aperture in said third housing.

10. The assembly according to claim 6, further comprising:
a third shaft being positioned in said first well in said second housing;
a second bearing being positioned around said third shaft, said second bearing engaging said second housing;
a third bearing being positioned around said third shaft, said third bearing engaging a bounding surface of said second aperture in said third housing; and
a third gear being positioned around said third shaft such that said third gear is positioned within said first well in said second housing, each of said first gears engaging said third gear such that said third gear defines a sun gear with respect to planetary gears defined by said first gears.

11. The assembly according to claim 8, further comprising a fourth shaft having a first end and a second end, said fourth shaft being positioned in said first well in said second housing, said fourth shaft extending through said first aperture in said third housing, said fourth shaft extending through each of said sixth and seventh apertures in said fourth housing having said first end of said fourth shaft being directed outwardly from said fourth housing, said first end of said fourth shaft being configured to be coupled to the generator.

12. The assembly according to claim 11, further comprising:
a fourth bearing being positioned around said fourth shaft, said fourth bearing engaging a bounding surface of said first aperture in said third housing;
a fifth bearing being positioned around said fourth shaft, said fifth bearing engaging a bounding surface of said sixth aperture in said fourth housing; and
a fourth gear being positioned around said fourth shaft, said fourth gear being aligned with said second end of said fourth shaft such that said fourth gear is positioned within said first well in said second housing, said fourth gear being aligned with said plurality of fifth apertures in said third housing.

13. The assembly according to claim 12, wherein:
said planetary driven unit includes:
a plurality of second shafts;
a plurality of first gears, each of said first gears being positioned on an associated one of said second shafts; and
a plurality of second gears each of said second gears being positioned on an associated one of said second shafts; and
each of said second gears engages said fourth gear such that said fourth gear defines a sun gear with respect to planetary gears defined by said second gears, each of said second shafts rotating said fourth shaft when the wind propellers rotate said first shaft, each of said second gears transferring rotational torque between said first gears and said fourth gear such that said fourth shaft rotates at a speed being greater than a rotational speed of said second housing; and
a fifth gear being positioned around said fourth shaft, said fifth gear being aligned with said plurality of eight apertures in said fourth housing.

14. The assembly according to claim 13, further comprising:
a plurality of fifth shafts, each of said fifth shafts being positioned within said fourth housing, each of said fifth shafts having a first end and a second end, said first end corresponding to each of said fifth shafts engaging said first end of said fourth housing, said second end corresponding to each of said fifth shafts engaging said second end of said fourth housing, said plurality of fifth shafts being spaced apart from each other and being distributed around said sixth and seventh apertures in said fourth housing; and
a plurality of sixth gears, each of said sixth gears being positioned around an associated one of said fifth shafts, each of said sixth gears being aligned with an associated one of said eighth apertures in said fourth housing, each of said sixth gears engaging said fifth gear such that each of said sixth gears defines a plurality of planetary gears with respect to a sun gear defined by said fifth gear, each of said sixth gears engaging said primary teeth in said second housing.

15. A planetary drive assembly being configured to transfer rotational torque between a plurality of wind propellers and a generator, said assembly comprising:
a first housing being coupled to a top end of a stanchion wherein said first housing is configured to be elevated above ground, said first housing having a first end, a second end and an outer wall extending therebetween, said outer wall being continuous such that said first housing has a cylindrical shape, said first housing being substantially hollow, each of said first end and said second end being open, said outer wall having an interior surface;
a tube being positioned within said first housing, said first housing having a plurality of interior walls, each of said interior walls extending between said interior surface of said first housing and said tube such that said tube is centrally positioned in said first housing having said tube being oriented collinear with said first housing, said tube being positioned closer to said second end of said first housing than said first end of said first housing;
a drive unit being rotatably positioned in said first housing, said drive unit being configured to have the plurality of wind propellers being coupled thereto thereby facilitating the wind propellers to rotate said drive unit, said drive unit comprising:
a first shaft having a primary end, a secondary end and an outer surface extending therebetween, said outer surface having a plurality of first indentations extending inwardly therein, said first indentations being spaced apart from each other and being distributed around said first shaft, each of said first indentations extending from said primary end toward said secondary end to define a plurality of first teeth on said first shaft, said outer surface having a plurality of second indentations extending inwardly therein, said second indentations being spaced apart from each other and being distributed around said first shaft, said second indentations extending from said secondary end toward said primary end to define a plurality of second teeth on said first shaft, said first shaft being positioned in said tube having said secondary end extending outwardly from said second end of said first housing and having said primary end being directed toward said first end of said first housing, said secondary end of said first shaft being configured to be coupled to the wind propellers, said first end having a primary well extending toward said second end, said outer surface having a secondary well extending inwardly therein, said secondary well intersecting said primary well wherein said secondary well is configured to receive a lubricant thereby facilitating the lubricant to travel through said primary well, a cap having a first wall and an outer wall, said outer wall of said cap being continuous such that said cap has a circular shape, said outer wall of said cap having a distal edge with respect to said first wall, said first wall having an opening extending therethrough, said distal edge of said cap abutting said second end of said first housing having said first shaft extending through said opening, said outer wall having a lip extending outwardly therefrom, said lip being aligned with said distal edge, a plurality of first fasteners, each of said first fasteners extending through said lip and engaging said second end of said first housing to retain said cap on said first housing, a plurality of first bearings, each of said first bearings being positioned between said tube and said outer surface of said first shaft such that said first shaft is rotatable in said tube, and a second housing having a first end, a second end and an outside wall extending therebetween, said outside wall being continuous such that said second housing has a cylindrical shape, said second housing being positioned within said first housing having said outside wall of said second housing being spaced from said outer wall of said first housing, said second housing extending between said tube in said first housing and said first end of said first housing, said outside wall having an inner surface and an outer surface, said outside wall having a first surface being vertically oriented between a first half and a second half of said second housing such that said first half has a diameter being greater than a diameter of said second half, said first surface being positioned closer to said second end of said second housing than said first end of said second housing, said first end of said second housing having a first well extending toward said second end of said second housing, said second end of said second housing having a second well extending toward said first end of said second housing, each of said first well and said second well having a bounding surface, said bounding surface of said first well having a plurality of primary indentations extending outwardly therein, said primary indentations extending from said first end of said second housing toward said second end of said second housing, each of said primary indentations being spaced apart from each other and being distributed around said first well to define a plurality of primary teeth in said second housing, said bounding surface of said first well having a plurality of secondary indentations extending outwardly therein, said secondary indentations being spaced from said primary indentations, each of said secondary indentations being oriented collinear with said primary indentations, said secondary indentations being spaced apart from each other and being distributed around said first well to define a plurality of secondary teeth in said second housing, said bounding surface of said second well having a plurality of tertiary indentations extending outwardly therein, each of said tertiary indentations extending from said second end of said housing toward said first end of said second housing, said tertiary indentations being spaced apart from each other and being distributed around said second well to define a plurality of tertiary teeth in said second housing, said plurality of first teeth on said first shaft engaging said plurality of tertiary teeth on said second housing such that said first shaft rotates said second housing; and a planetary driven unit being rotatably positioned in said first housing, said planetary driven unit being in mechanical communication with said drive unit such that said drive unit rotates said planetary driven unit when the wind propellers rotate said drive unit, said planetary driven unit being mechanically discrete from said first housing such that said planetary driven unit inhibits said first housing from being exposed to rotational torque, said planetary driven unit being configured to be coupled to a generator thereby facilitating the wind propellers to rotate the generator, said planetary driven unit comprising:

a third housing having a first end, a second end and an outermost wall extending therebetween, said outermost wall being continuous such that said third housing has a cylindrical shape, said third housing being substantially hollow, said first end of said third housing having a first aperture extending into an interior of said third housing, said first aperture being centrally positioned on said first end of said third housing, said second end having a second aperture extending into said interior of said third housing, said second aperture being aligned with said first aperture, said first end of said third housing having a plurality of third apertures each extending into said interior of said third housing, each of said third apertures being spaced apart from each other and being distributed around said first aperture, said second end of said third housing having a plurality of fourth apertures each extending into said interior of said third housing, each of said fourth apertures being aligned with an associated one of said third apertures, said outermost wall having a plurality of fifth apertures each extending into said interior of said third housing, said fifth apertures being spaced apart from each other and being distributed around said outermost wall, said third housing being positioned within said second housing having said outermost wall being spaced from said outside wall of said second housing, each of said fifth apertures being aligned with said secondary teeth in said second housing, a plurality of second shafts, each of said second shafts having a first end and a second end, each of said second shafts extending through an associated pair of said third and fourth apertures in said third housing, a plurality of first gears, each of said first gears being positioned around an associated one of said second shafts, each of said first gears being positioned in an associated one of said fifth apertures in said third housing, said first gear corresponding to each of said second shafts engaging said secondary teeth in said second housing such that said second housing rotates each of said second shafts having each of said second shafts orbiting about an axis extending through said first and second ends of said third housing, each of said first gears being continuously aligned with said associated fifth aperture when said third housing rotates, a plurality of second gears, each of said second gears being positioned around an associated one of said second shafts, each of said second gears being positioned in an associated one of said fifth apertures in said third housing, each of said second gears being positioned between said first end of said associated second shaft and said corresponding first gear, each of said second gears being continuously aligned with said associated fifth aperture when said third housing rotates, a fourth housing having a first end, a second end and an exterior wall extending therebetween, said exterior wall being continuous such that said fourth housing has a cylindrical shape, said fourth housing being substantially hollow, said first end of said fourth housing having a sixth aperture extending into an interior of said fourth housing, said sixth aperture being centrally positioned on said first end of said fourth housing, said second end of said fourth housing having a seventh aperture extending into said interior of said fourth housing, said seventh aperture being aligned with said sixth aperture, said exterior wall having a plurality of eighth apertures each extending into said interior of said fourth housing, said eighth apertures being spaced apart from each other and being distributed around said exterior wall, said fourth housing extending into said first well in said second housing having said first end of said fourth housing being aligned with said first end of said first housing, said second end of said fourth housing being space from said first end of said third housing having said seventh aperture being aligned with said first aperture in said third housing, a third shaft being positioned in said first well in said second housing, a second bearing being positioned around said third shaft, said second bearing engaging said second housing, a third bearing being positioned around said third shaft, said third bearing engaging a bounding surface of said second aperture in said third housing, a third gear being positioned around said third shaft such that said third gear is positioned within said first well in said second housing, each of said first gears engaging said third gear such that said third gear defines a sun gear with respect to planetary gears defined by said first gears, a fourth shaft having a first end and a second end, said fourth shaft being positioned in said first well in said second housing, said fourth shaft extending through said first aperture in said third housing, said fourth shaft extending through each of said sixth and seventh apertures in said fourth housing having said first end of said fourth shaft being directed outwardly from said fourth housing, said first end of said fourth shaft being configured to be coupled to the generator, a fourth bearing being positioned around said fourth shaft, said fourth bearing engaging a bounding surface of said first aperture in said third housing, a fifth bearing being positioned around said fourth shaft, said fifth bearing engaging a bounding surface of said sixth aperture in said fourth housing, a fourth gear being positioned around said fourth shaft, said fourth gear being aligned with said second end of said fourth shaft such that said fourth gear is positioned within said first well in said second housing, said fourth gear being aligned with said plurality of fifth apertures in said third housing, each of said second gears engaging said fourth gear such that said fourth gear defines a sun gear with respect to planetary gears defined by said second gears, each of said second shafts rotating said fourth shaft when the wind propellers rotate said first shaft, each of said second gears transferring rotational torque between said first gears and said fourth gear such that said fourth shaft rotates at a speed being greater than a rotational speed of said second housing, a fifth gear being positioned around said fourth shaft, said fifth gear being aligned with said plurality of eight apertures in said fourth housing, a plurality of fifth shafts, each of said fifth shafts being positioned within said fourth housing, each of said fifth shafts having a first end and a second end, said first end corresponding to each of said fifth shafts engaging said first end of said fourth housing, said second end corresponding to each of said fifth shafts engaging said second end of said fourth housing, said plurality of fifth shafts being spaced apart from each other and being distributed around said sixth and seventh apertures in said fourth housing, a plurality of sixth gears, each of said sixth gears being positioned around an associated one of said fifth shafts, each of said sixth gears being aligned with an associated one of said eighth apertures in said fourth housing, each of said sixth gears engaging said fifth gear such that each of said sixth gears defines a plurality of planetary gears with respect to a sun gear defined by said fifth gear, each of said sixth gears engaging said primary teeth in said second housing, a ring having a first surface and a second surface, said first surface rotatably engaging said first end of said fourth housing, said first surface abutting said first end of said first housing, and a plurality of second fasteners, each of said second fasteners extending through said first and second surfaces of said ring and engaging said first end of said first housing to retain said ring on said first housing.

* * * * *